(12) United States Patent
Al-Hallaj et al.

(10) Patent No.: US 9,784,509 B2
(45) Date of Patent: Oct. 10, 2017

(54) OPTIMIZED HEATING AND COOLING SYSTEM

(75) Inventors: Said Al-Hallaj, Chicago, IL (US); Sohail Murad, Chicago, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 403 days.

(21) Appl. No.: 14/122,553

(22) PCT Filed: May 25, 2012

(86) PCT No.: PCT/US2012/039695
§ 371 (c)(1),
(2), (4) Date: Feb. 12, 2014

(87) PCT Pub. No.: WO2012/166650
PCT Pub. Date: Dec. 6, 2012

(65) Prior Publication Data
US 2014/0166232 A1    Jun. 19, 2014

Related U.S. Application Data

(60) Provisional application No. 61/490,768, filed on May 27, 2011.

(51) Int. Cl.
*F28D 17/00* (2006.01)
*F28F 27/00* (2006.01)
(Continued)

(52) U.S. Cl.
CPC ............. *F28F 27/00* (2013.01); *F24J 3/08* (2013.01); *F24J 3/083* (2013.01); *F25B 30/06* (2013.01);
(Continued)

(58) Field of Classification Search
CPC ...... F28F 27/00; F24J 3/08; F24J 3/081; F24J 3/082; F24J 3/083; F24J 2003/089;
(Continued)

(56) References Cited

U.S. PATENT DOCUMENTS 4,392,531 A * 7/1983 Ippolito ................. E21B 43/04
165/45
5,461,876 A * 10/1995 Dressler .................. F24J 3/083
237/2 B (Continued)

OTHER PUBLICATIONS

International Search Report for International Application No. PCT/US2012/39695.

*Primary Examiner* — Claire Rojohn, III
(74) *Attorney, Agent, or Firm* — Gamburd Law Group LLC

(57) ABSTRACT

An optimized heating and cooling system including a thermal mass, thermal energy transport conduits to deliver thermal energy to the thermal mass including one or more phase change materials (PCMs), at least one heat exchanger to exchange the thermal energy from a energy input into heat transfer fluid that is pumped through the thermal mass. The system also includes a controller in electronic communication with a temperature sensor, a throttle and a pump. A desired building temperature profile, a daily temperature forecast, the electricity rates, the thermal characteristics of the PCMs are entered into or obtained by the controller and the controller uses that information to optimize the energy use to avoid using the heating and cooling system during peak electricity demand time, or uses the rate structure to determine the operation sequence that results in the most efficient use of energy or least cost.

20 Claims, 8 Drawing Sheets

(51) Int. Cl.
*F24J 3/08* (2006.01)
*F28D 20/02* (2006.01)
*F25B 30/06* (2006.01)

(52) U.S. Cl.
CPC .......... *F28D 20/021* (2013.01); *Y02E 10/125* (2013.01); *Y02E 60/145* (2013.01)

(58) Field of Classification Search
CPC ...... F25B 30/06; F28D 20/021; Y02E 10/125; Y02E 60/145
USPC ........................................ 165/10, 61, 104.19
See application file for complete search history.

(56) References Cited

U.S. PATENT DOCUMENTS

| | | | | |
|---|---|---|---|---|
| 5,924,486 | A * | 7/1999 | Ehlers | F24F 11/006 165/238 |
| 7,147,071 | B2 * | 12/2006 | Gering | B60H 1/00278 165/164 |
| 7,969,075 | B2 * | 6/2011 | Weaver | F21S 48/328 165/104.21 |
| 9,222,704 | B2 * | 12/2015 | McAlister | B01J 19/0053 |
| 2003/0024686 | A1 * | 2/2003 | Ouellette | C05F 17/0063 165/47 |
| 2007/0295477 | A1 * | 12/2007 | Mueller | F24J 3/08 165/45 |
| 2008/0230203 | A1 * | 9/2008 | Christ | C09K 5/063 165/10 |
| 2009/0004556 | A1 * | 1/2009 | Al-Hallaj | H01M 10/4207 429/120 |
| 2009/0093916 | A1 | 4/2009 | Parsonnet et al. | |
| 2010/0199975 | A1 * | 8/2010 | Bailey | F24D 3/105 126/617 |
| 2010/0276300 | A1 * | 11/2010 | Teymour | B01D 15/00 205/637 |
| 2011/0030753 | A1 | 2/2011 | Weaver et al. | |
| 2011/0308259 | A1 * | 12/2011 | Wray | F16L 55/103 62/3.3 |
| 2012/0119510 | A1 * | 5/2012 | Herzen | F03D 9/28 290/1 C |
| 2012/0216990 | A1 * | 8/2012 | Quintero | C09K 8/035 165/104.13 |
| 2016/0084544 | A1 * | 3/2016 | Radermacher | C09K 5/10 165/10 |

* cited by examiner

OPTIMIZED HEATING AND COOLING SYSTEM

CROSS-REFERENCE TO RELATED APPLICATIONS

This application is a U.S. National Phase Application of International Application No. PCT/US2012/39695 filed May 25, 2012, which claims priority to U.S. Provisional Patent Application No. 61/490,768 filed May 27, 2011, entitled OPTIMIZED HEATING AND COOLING SYSTEM, which document is hereby incorporated by reference to the extent permitted by law.

BACKGROUND OF THE INVENTION

Field of the Invention

The field of this invention is in building and facilities heating and cooling systems, including the use of geothermal energy for heating and cooling.

Related Art

Radiant heat systems for buildings and facilities are known. Such systems heat a fluid, typically water, and circulate it through a series of pipes that are embedded in a thermal mass, for example a concrete floor. These systems are known for their inefficiency and are known to have poor coefficients of performance. Also, because they are principled on real-time radiant heat transfer, the system must be continually operated to maintain the temperature of the thermal mass of a comfortable environment, especially during the peak temperature extremes in a given day.

SUMMARY OF THE INVENTION

The invention comprises the use of a system to optimize the energy requirements for heating and cooling buildings, facilities, or open areas using radiant heating or cooling effect of slabs or other thermal masses. The thermal mass or slab may be heated or cooled using geothermal systems, a conventional gas or electric boiler, furnace, air conditioning compressor, a green energy source like wind or solar energy, or other energy source now known or hereafter developed. The heated or cooling fluid is pumped through the thermal mass to either add heat that can be radiated throughout the adjacent air space, or to remove heat to provide a cooling effect throughout the adjacent air space. One embodiment utilizes a geothermal system using thermal energy in groundwater that may be recovered by a heat pump through either an open or closed lower loop underground.

The thermal mass incorporates phase change materials (PCMs) to temper the release or absorption of thermal energy. The PCMs are placed in thermal communication with the circulating heating fluid of the upper loop. The PCMs may be in a wrapping around the conduit pipes, a material component of the thermal mass, or be incorporated into panels in thermal communication with the thermal mass for retrofit applications akin to floor tiles, wall tiles, or ceiling tiles, and may be in thermal communication with the surface of the thermal mass or within the space immediately adjacent to the thermal mass. The PCMs continue to absorb energy subsequent a phase change from solid to liquid and, depending on the individual properties, may store or release thermal energy over a prolonged period of time. Accordingly, the PCMs, which efficiently store energy, may be used with a radiant heating or cooling system to heat or cool the interior of a building, keep the surface of a slab clear of ice at a public facility such as a bus stop or train station, or may radiate heat to other public facilities or buildings, either indoors or outdoors. The same system may be configured simultaneously or alternatively for cooling. The PCMs may be used to extract heat from either a thermal mass or the atmosphere adjacent to it, and transfer the extracted heat energy to the heat exchange flowing through the thermal delivery conduits which thereby cools the slab and its adjacent environment. In one embodiment, heat energy retained in the thermal delivery fluid is then transferred to a lower loop, to be dissipated into the groundwater. Among other aspects of the invention, an advantageous coefficient of performance and a higher efficiency are achieved through the capability of the PCMs to store energy that can be released slowly in combination with the energy output of the conventional system using geothermal or conventional methods.

The system of the present invention incorporates a control system that processes a variety of inputs combined with a known thermal storage property of the PCM(s) to optimize the heating and cooling system thereby resulting in at least the following efficiencies: reducing operational costs by using the stored thermal energy to supplement the real-time heating and cooling effect of the system during times of peak demand and/or re-charging the PCMs at off-peak energy demand periods or period with the least energy costs, reducing total energy consumption, reducing the equipment cost as the system no longer needs to remediate peak-loading, and reducing the total energy consumed by the heating and cooling system thereby conserving valuable resources.

Other aspects and advantages of the present invention will be apparent from the following detailed description of the preferred embodiments and the accompanying drawing figures.

BRIEF DESCRIPTION OF THE DRAWINGS

The accompanying drawings form a part of the specification and are to be read in conjunction therewith, in which like reference numerals are employed to indicate like or similar parts in the various views, and wherein.

DETAILED DESCRIPTION

The following detailed description of the invention references the accompanying drawing figures that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

Figure 1:
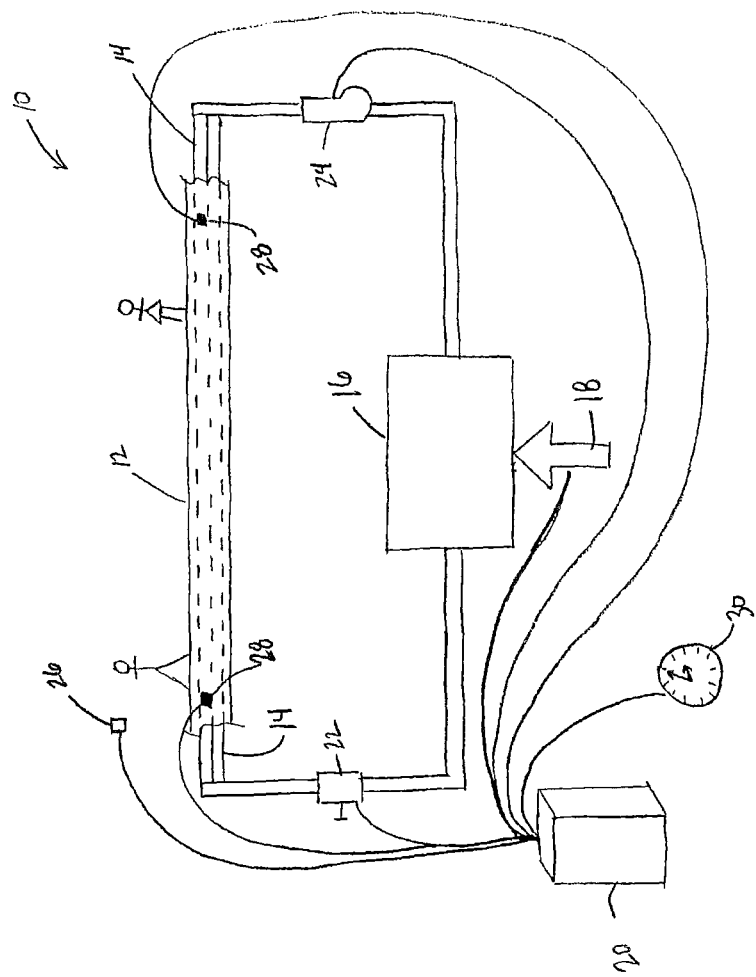
FIG. 1 is a schematic diagram of the heating and cooling system in accordance with one embodiment of the present invention.

FIG. 1 illustrates the optimized heating and cooling system 10 of the present invention. Optimized heating and cooling system 10 includes a thermal mass 12, a thermal energy transport conduit 14, a heat exchanger 16, an energy input 18, a controller 20, a throttle 22, a pump 24, at least one thermostat 26, at least one temperature sensor 28, and a clock 30.

Figure 2:
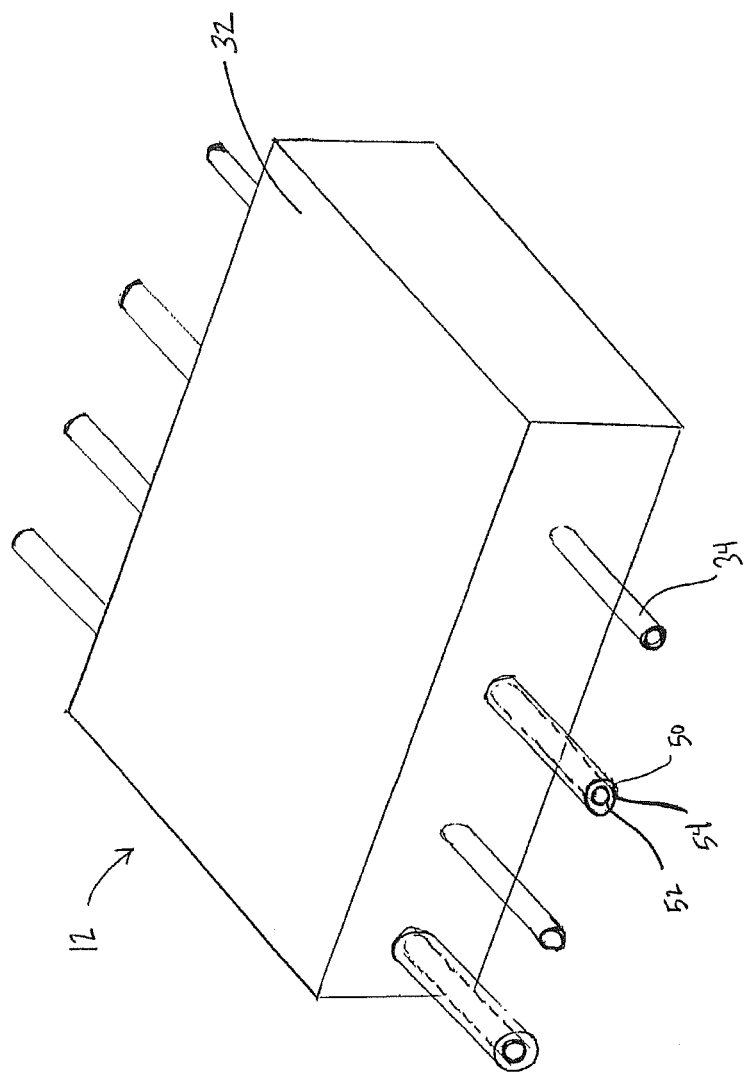
FIG. 2 is perspective cutaway view of a fluid circulating system in accordance with one embodiment of the of the heating and cooling system of the present invention.

Thermal mass 12 may be any thermal mass now known or hereafter developed including but not limited to a concrete slab, a rock formation, or a fluid reservoir. Thermal energy transport conduits 14 are in thermal communication with thermal mass 12. One embodiment includes thermal energy transport conduits embedded or located within thermal mass 12 as shown in FIG. 2. Thermal energy transport conduits may be hollow pipes or tubing that carry a heat transfer fluid such as water or glycol-based coolant. Any known heat transfer fluid or combination thereof is within the scope of the present invention. Alternatively, thermal energy transport conduits may be electrical wires that feed resistive elements embedded in thermal mass wherein the resistive elements generate heat when electricity flows therethrough.

Heat exchanger 16 generally transfers energy from energy source 18 to heat transfer fluid within the thermal energy transport conduits 14. Heat exchanger 16 may be any known heat exchange device now known or hereafter developed. In an embodiment of the present invention using fuel or electric generated heat, the heat exchanger 16 may be a gas, oil, coal or electric heating element such as a furnace, boiler or water heater that heats the heat transfer fluid flowing through the energy transport conduits 14. Alternatively, heat exchanger 16 may be one used in conventional open and closed loop geothermal systems as described in detail below. Still further, heat exchanger 16 may be an electric transformer configured to receive commercially available electrical supply and output a current required to power resistance based thermal energy transport conduits.

Energy input 18 provides the energy necessary to introduce thermal energy from a heat source into the thermal mass 12 to be radiated into the surrounding atmosphere. Energy input 18 may be natural gas, gasoline, diesel, or other oil-based fuel, coal, electricity, geothermal or any other known commercial or residential fuel source. Electricity may be provided from the commercial and residential utility grid or may be from a green source such as a wind or solar generator.

Controller 20 monitors many operational parameters and controls many functions of heating and cooling system 10. In certain embodiments, controller 20 may actively monitor heating and cooling system's 10 function and performance including: the outside temperature, the internal building temperature, the temperature of the thermal mass, the flow rate of heat transfer fluid through the conduits 14, fluid pressure within conduits 14, temperature of heat transfer fluid before and after heat transfer in thermal mass 12, and whether the system and components are running properly. Controller 20 also controls heating and cooling system's 10 functions and settings including: start and stop, adjusting the pump speed, flow rate of the heat transfer fluid, heat input into the heating transfer fluid, allowing auxiliary control, writing and editing heating and cooling use or loading programs, and heat and cooling sequential programs. Embodiments of the present invention may also include controller 20 causing the alert of a user if there are any errors in the operation of heating and cooling system 10, or if any of the functions or conditions the controller 20 is monitoring have ceased or are outside an acceptable range. Further, controller 20 may monitor availability of green energy sources, such as wind generated or solar energy depending on the environmental conditions that generate such energy. Based upon the availability of the green energy sources, controller 20 may control a switch that effectively runs the system off of the green energy sources while they are available and, otherwise, switches to run the system off of the commercial grid. Moreover, besides for performing the tasks of monitoring and collecting various inputs and controlling operational and scheduling daily operations of the heating and cooling system of the present invention, controller 20 may also communicate with smart grid protocols that have customized software programming features over a public or private network, such as the internet. Controller 20 may provide smart grid operators direct and/or automatic access to grid spot market pricing and stress levels and controller 20 will enable automatic software communication with utility and grid operators to access the heating and cooling systems of the present invention and provide them with an automatic systems operation feature to override the heating and cooling system's standard schedule (for a fee) during peak hours and during emergency situations such as blackouts or brownouts.

Figure 5:
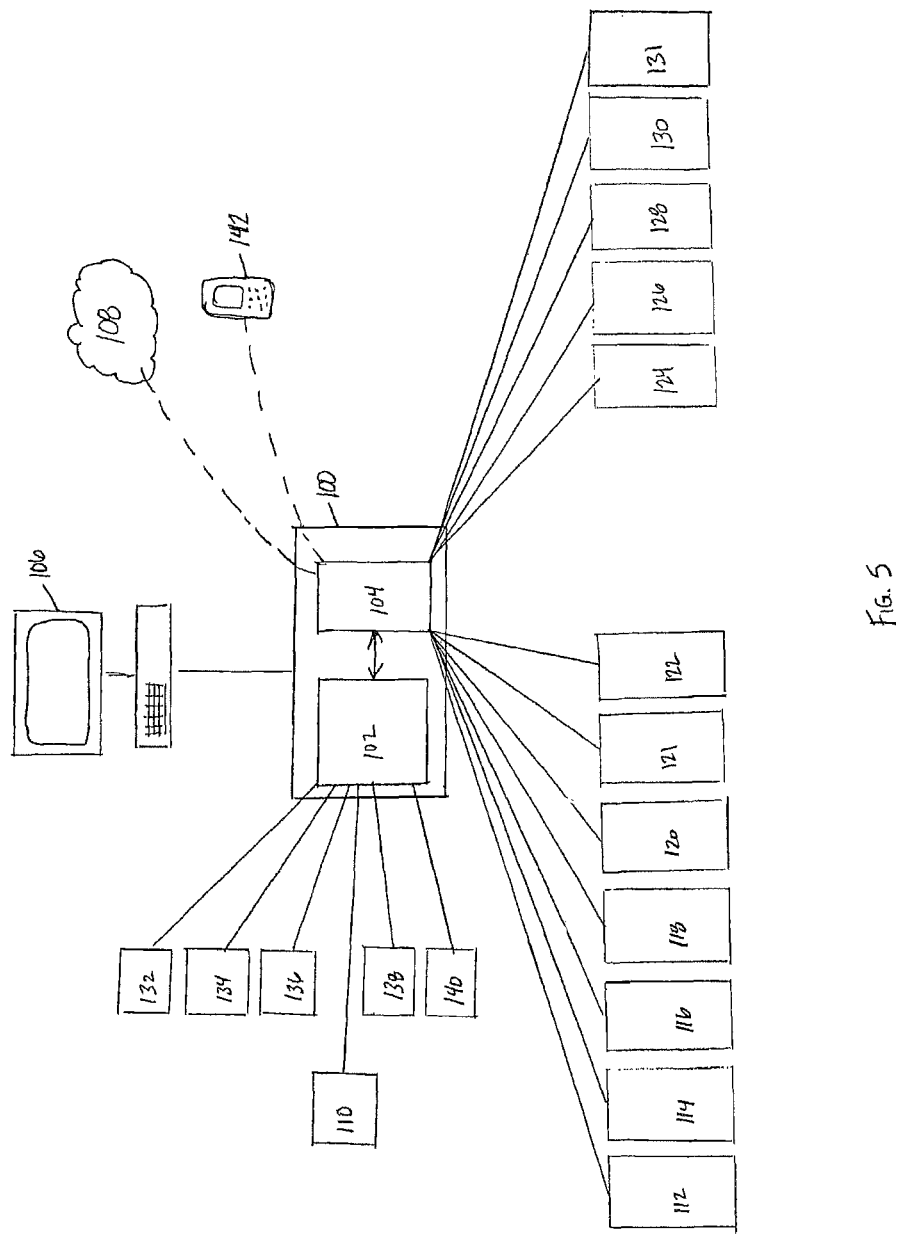
FIG. 5 is a schematic diagram of the heating and cooling system in accordance with one embodiment of the present invention.

As diagramed in FIG. 5, controller 20 comprises a unit 100 that includes at least an internal memory 102, a microprocessor 104, and a user-interface 106. Optionally, user-interface 106 may be separate from the unit 100 as shown in FIG. 5. User-interface 106 allows a user to input data and/or desired parameters, observe and obtain operating data, and receive output of heating and cooling system's 10 operational status. Controller 20 is generally operated using an algorithm or software entered into and stored upon internal memory 104 and may be connected to a private or public network 108, including the internet, which allows a user to pull information from the internet and store it in the internal memory 102. Particularly, one embodiment includes a weather forecast 110 being hourly and generally obtained from the internet and stored or manually written onto the internal memory 102 at a defined time interval, such as every hour, or even in real time. User interface 106 allows a user, such as building maintenance personnel, to input operational parameters, view the operational status of heating and cooling system 10, and monitor the status of the heating and cooling system. These parameters may be sent to a mobile device 142 carried by the user by controller 20. Controller 20 is generally in electronic communication with the various sensors, switches, motors, valves, pumps, and monitors that control the operation of heating and cooling system thereby allowing controller 20 to monitor the operating conditions of heating and cooling system 10. In particular as shown in FIG. 5, processor may be in electronic communication with passive sensors to monitor the operation of heating and cooling system 10 including, but not limited to: slab temperature sensor 112, phase change sensor 114, heat transfer fluid flow rate sensor 116, a thermostat 118, outside temperature sensor 120, an electricity source sensor 121, and conduit pressure sensor 122. Phase change sensor 114 may communicate the temperature of a volume of the PCMs and/or the material phase of the PCM being liquid or solid.

As seen in FIG. 5, processor 104 may also be in electronic communication with active controls such that after processing the inputs, processor 104 can signal and control the operation of components of heating and cooling system 10 including, but not limited to: a pump switch 124, a pump throttle 126, actuator to open or close one or more valves controlling the flow of the cooling fluid 128, switch 130 to turn on heat exchanger 16 and switch 131 to selectively power all or a portion of the system from a green energy source when available. Electronic communication may be achieved through a wired or a wireless connection, or any other electronic communication method known in the art.

Internal memory 102 may have operational parameters or other data used by processor 104 to control the operation and performance of heating and cooling system stored upon it including, but not limited to: phase change material data 132, weather forecast information 134, electricity rate chart 136, building use data (desired internal temps during a typical day) 138, and the temporary storage of the sensor readings 140. Thus, processor 104, being in electronic communication with the internal memory 102 can recall the stored information from internal memory 102 as necessary while controlling the performance of the system of the present invention. A person of skill in the art will recognize that many embodiments of the electronic controls of controller 20 are known in the art and any similar controls 18 now known or hereafter developed are within the scope of the present invention.

Now turning to FIG. 2, showing an embodiment of the present invention wherein thermal mass 12 is a concrete slab 32 as may be used in a building or public facility, for example, as a floor, ceiling, or wall. Embedded within the slab are circulating conduits, such as pipes 34. Slab 32 may be made of known materials such as concrete. Further, in the present invention, slab 32 may incorporate previously used or recycled materials or, alternatively, may be comprised of a structure configured to hold and retain PCMs in thermal communication with both the circulating fluid in the pipes 12 and also the surface 48 of the slab.

Figure 3:
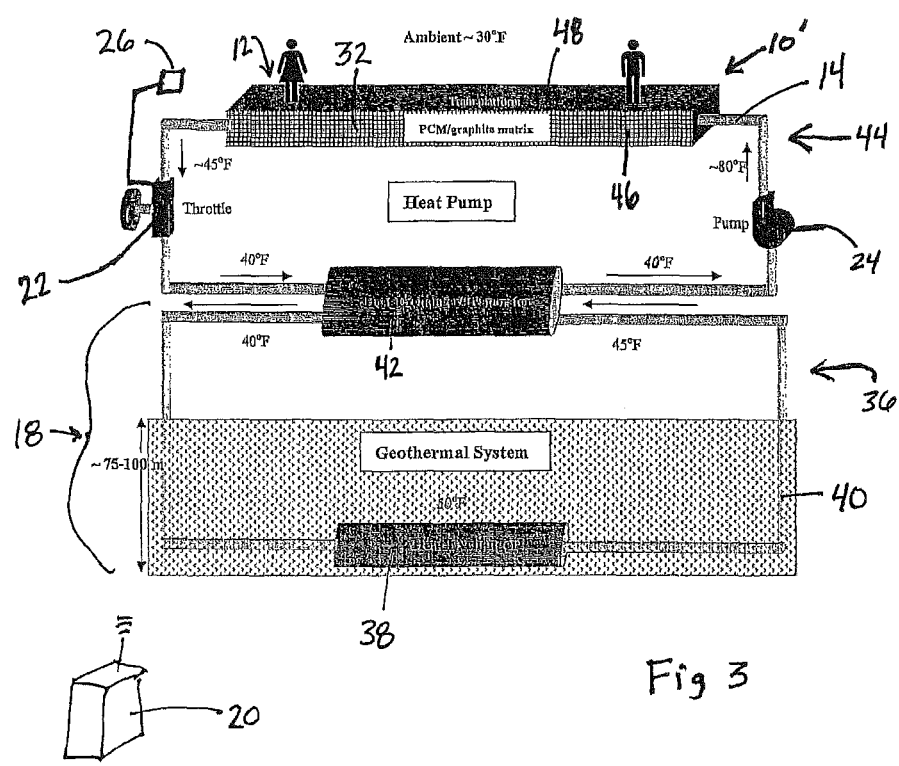
FIG. 3 is a schematic diagram of a geothermal/PCM heating and cooling system in accordance with one embodiment of the heating and cooling system of the present invention.

FIG. 3 is a schematic view of one embodiment of heating and cooling system 10 of the present invention incorporating geothermal energy for efficient heating and cooling. The geothermal system takes advantage of the fact that groundwater and/or soil maintains a constant temperature of approximately 50° F. at depths typically in the range of 75-100 meters deep. Accordingly, a lower loop 36 is established for circulating a fluid into the constant temperature area at depth. For heating, a first, lower heat exchanger 38 absorbs heat from the groundwater and transmits it to a fluid such as water in the lower loop 36. The loop can be a closed loop 40 containing a heat transfer fluid such as water, or alternatively may be an open loop system opening into an available reservoir of fluid, such as water at the bottom of a pond, lake or holding basin, which also maintains a constant temperature through the year. The heat exchanger 38 may use this energy to heat the water in the loop to as much as 120°-130° F. Alternatively, when cooling is desired, heat absorbed in the thermal mass 12 from the atmosphere may be dissipated into the groundwater by the lower heat exchanger 38 and the fluid in the lower loop 36 may be cooled. The treated lower loop fluid, either heated or cooled, is circulated through a second, upper heat exchanger 42 which puts the lower loop 36 in thermal communication with an upper circulating loop 44. The upper circulating loop 44 may contain a heat transfer fluid such as water or other thermally advantageous fluid such as a glycol based, or other refrigerant, which may, for example, be R134a, R290, R407C and R410a as known in the art.

In this fashion the upper heat exchanger 42 heats or cools the heat transfer fluid in the upper loop 44 through the thermal energy delivery conduits 14 for distribution in slab 32. The heat transfer fluid in the upper circulating loop 44, having been heated or cooled by the upper heat exchanger 42, is advanced toward the slab by a pump 24. The upper thermal energy fluid then heats or cools slab 32 as it flows through the thermal energy delivery conduits 14. A throttle 22 controls the circulation of fluid to be either on, off, fast or slow, as dictated by controller 20, an operator or an automatic thermostat 26.

Slab 32 in the depicted embodiment shows advantageous deployment of the system of the present invention as the platform of a public facility such as a bus stop or a train station. Slab 32 has within it a circulating network of thermal energy delivery conduits 14, such as the pipes 34 depicted in FIG. 2. In the depicted embodiment, slab 32 is comprised of a lattice 46 of material whose members in combination are sufficiently strong to support the weight of the use for which the slab is deployed, such as the weight of people waiting for a train. The lattice 46 may also define within itself spaces into which PCMs are deployed and held. The circulating pipes 14 may also be distributed throughout lattice 46 in a position such that they may put the heated or cooled heat transfer fluid within them in thermal communication with the PCMs in order to transfer heating or cooling energy to or from the PCMs. Alternatively, lattice 46 may support the wiring and resistive elements necessary to complete the required electrical circuitry allowing electricity to generate heat in resistive elements that are in thermal communication with the PCMs.

One embodiment includes the PCMs being in a flexible wrap that wraps around the conduit or, as shown in FIG. 2, a dual pipe system having an outer pipe 50 having a larger diameter than an inner pipe 52 that the heat transfer fluid flows through, wherein the PCMs fill the void space 54 between the inner and outer diameters. PCMs may be integrated into the system in any other configuration that places the PCMs proximate the conduits 14 or the thermal mass to absorb thermal energy. The PCMs receive the heat and store heating or cooling energy. Once a thermal exchange of energy with the PCMs has reached a user selectable threshold, the energy is retained by the PCMs with sufficient efficiency that the circulating of the fluid may be reduced or stopped altogether. Thereafter, and as shown in FIG. 3, the PCMs will continue to transfer thermal energy through the slab to the slab surface 48 and the immediately adjacent atmosphere to heat it. For cooling, the PCMs receive thermal energy from the atmosphere and slab surface 48 and store it until it can be conveyed away by circulating cooling fluid in the upper loop 44.

Phase change materials (PCMs) are materials that store or release energy by the changing their aggregate state (phase) at a relatively constant temperature, such as melting or solidifying. PCMs are classified as latent heat storage (LHS) units, i.e., the heat absorption or release occurs when the thermal storage material undergoes a phase change from solid to liquid or liquid to gas or vice versa. PCMs can absorb and release heat at a nearly constant temperature, and store five (5) to fourteen (14) times more heat per unit volume than conventional storage materials such as water, concrete, masonry, or rock. A large number of PCMs are known to exist, and can be designed with a target phase change temperature or combined to create a certain target temperature for cooling and a target temperature for heating.

In general, for materials to be used as latent heat storage medium within a concrete slab or other thermal mass used in areas accessible by the public, they must exhibit certain desirable thermodynamic, kinetic and chemical properties which include: i) suitable phase-transition (melting or boiling) temperature having a high latent heat of phase change and high thermal conductivity; ii) high density resulting in small density changes in melting/solidification and a low vapor pressure; iii) no super cooling properties (i.e. it cannot be cooled below the freezing temperature without solidifying) and also having a high crystallization rate; iv) being chemically stabile and containing no toxicity and being a low fire hazard; and (v) being chemically compatible with construction materials. Overall, materials to be used for phase change thermal energy storage must have a large latent heat and high thermal conductivity properties, they may have a melting temperature lying in the practical range of operation, melt congruently with minimum subcooling and be chemically stable, low in cost, non-toxic and non-corrosive. Subcooling occurs when the PCM goes below its melting temperature without complete solidification. This happens due to poor thermal conductivity in the PCM and using an enhancement thermal conductivity matrix such as graphite matrix 46 set forth herein effectively dissipates the heat in the PCM and prevents subcooling from occurring. Subcooling prevents the PCMs from effectively dissipating and absorbing thermal energy because it does not release or absorb thermal energy due to the phase change at the known melting temperature. In addition, the feasibility of using PCMs in commercial construction may be dependent the cost, which must be reasonable as well as having a plentiful and stable supply source. PCMs can be classified into three major categories by their composition: 1) Organic PCMs, classified as paraffin or non-paraffin; 2) Inorganic PCM, classified as salt hydrate or metallic; 3) Eutectic PCM. Organic PCMs appear to best meet these criteria.

Figure 6:
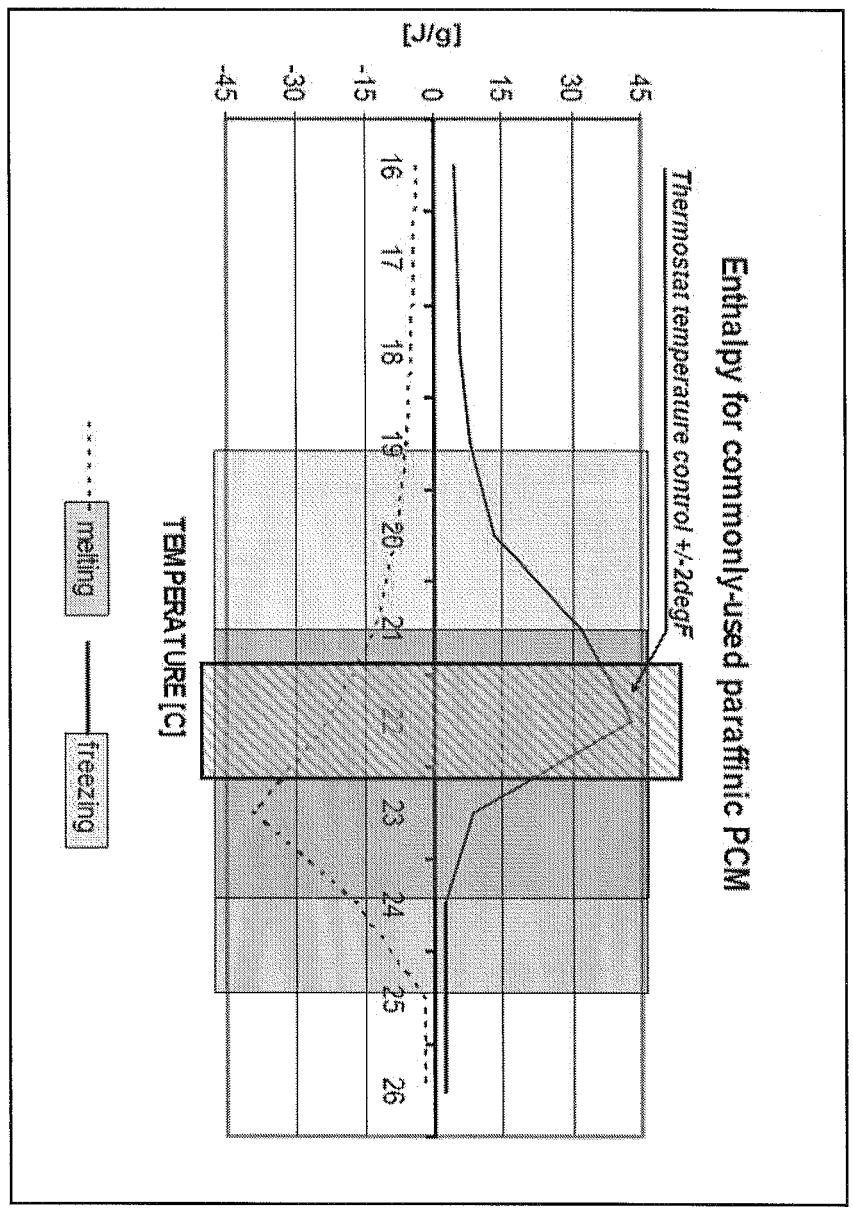
FIG. 6 is an enthalpy curve for a phase change material in accordance with one embodiment of the heating and cooling system of the present invention.

Depending on the applications, PCMs should first be selected based on their melting temperature. PCMs that melt below 15° C. may be used for cooling applications for air conditioning. While materials that melt above 90° C. may used for absorption refrigeration. Commercial paraffin waxes are cheap with moderate thermal storage densities (~200 kJ/kg or 150 MJ/m3) and a wide range of melting temperatures. Paraffin waxes undergo negligible subcooling and are chemically inert and stable with no phase segregation. FIG. 6 presents the enthalpy curve for commonly used parafinic PCM. Metallic fillers or metal matrix structures may also be used in combination with a paraffin wax to improve its thermal conductivity.

The PCMs may be microencapsulated PCMs (3-100 μm) or macroencapsulated PCMs (1-3 mm). The encapsulated PCMs may provide higher heat transfer area, increased PCM stability in harsh environments and more controlled changes in the volume when the phase change occur.

PCMs as used herein may include without limitation: Organic PCMs, such as Paraffin ($CnH_{2n+2}$) and Fatty acids ($CH_3(CH_2)_{2n}COOH$), Palm oil or $Mn(NO_3)_2$ $6H_2O$+ $MnCl_2$ $4H_2O$ (4 wt %) or Laurie acid; Inorganic PCMs such as Salt hydrates ($MnH_2O$) Trimethylolethane (63 wt %)+water (37 wt %), Sodium silicate $Na_2SiO_3$ $5H_2O$, Zinc or Aluminum containing compounds; or Eutectics such as Organic-organic, organic-inorganic, inorganic-inorganic compounds, polymers, or sodium acetate. PCMs within the scope of the present invention also include without limitation those in the chart below.

TABLE 3

Measured thermophysical data or some PCMs [36]

| Compound | Melting temp. (° C.) | Heat of fusion (kJ/kg) | Thermal conductivity (W/m K) | Density (kg/m³) |
|---|---|---|---|---|
| Inorganics | | | | |
| $MgCl_2 \cdot 6H_2O$ | 117 | 168.6 | 0.570 (liquid, 120° C.) | 1450 (liquid, 120° C.) |
| | | | 0.694 (solid, 90° C.) | 1569 (solid, 20° C.) |
| $Mg(NO_3)_2 \cdot 6H_2O$ | 89 | 162.8 | 0.490 (liquid, 95° C.) | 1550 (liquid, 94° C.) |
| | | | 0.611 (solid, 37° C.) | 1636 (solid, 25° C.) |
| $Ba(OH)_2 \cdot 8H_2O$ | 48 | 265.7 | 0.653 (liquid, 85.7° C.) | 1937 (liquid, 84° C.) |
| | | | 1.225 (solid, 23° C.) | 2070 (solid, 24° C.) |
| $CaCl_2 \cdot 6H_2O$ | 29 | 190.8 | 0.540 (liquid, 38.7° C.) | 1562 (liquid, 32° C.) |
| | | | 0.1.088 (solid, 23° C.) | 1802 (solid, 24° C.) |
| Organics | | | | |
| Paraffin wax | 64 | 173.6 | 0.167 (liquid, 63.5° C) | 790 (liquid, 65° C.) |
| | | | 0.346 (solid, 33.6° C.) | 916 (solid, 24° C.) |
| Polyglycol E600 | 22 | 127.2 | 0.189 (liquid, 38.6° C.) | 1126 (liquid, 25° C.) |
| | | | — | 1232 (solid, 4° C.) |
| Fatty acids | | | | |
| Palmitic acid | 64 | 185.4 | 0.162 (liquid, 68.4° C.) | 850 (liquid, 65° C.) |
| | | | — | 989 (solid, 24° C.) |
| Capric acid | 32 | 152.7 | 0.153 (liquid, 38.5° C.) | 878 (liquid, 45° C.) |
| | | | — | 1004 (solid, 24° C.) |
| Caprylic acid | 16 | 148.5 | 0.149 (liquid, 38.6° C.) | 901 (liquid, 30° C.) |
| | | | — | 981 (solid, 13° C.) |
| Aromatics | | | | |
| Naphthalene | 80 | 147.7 | 0.132 (liquid, 83.8° C.) | 976 (liquid, 84° C.) |
| | | | 0.341 (solid, 49.9° C.) | 1145 (solid, 20° C.) |

Figure 7:
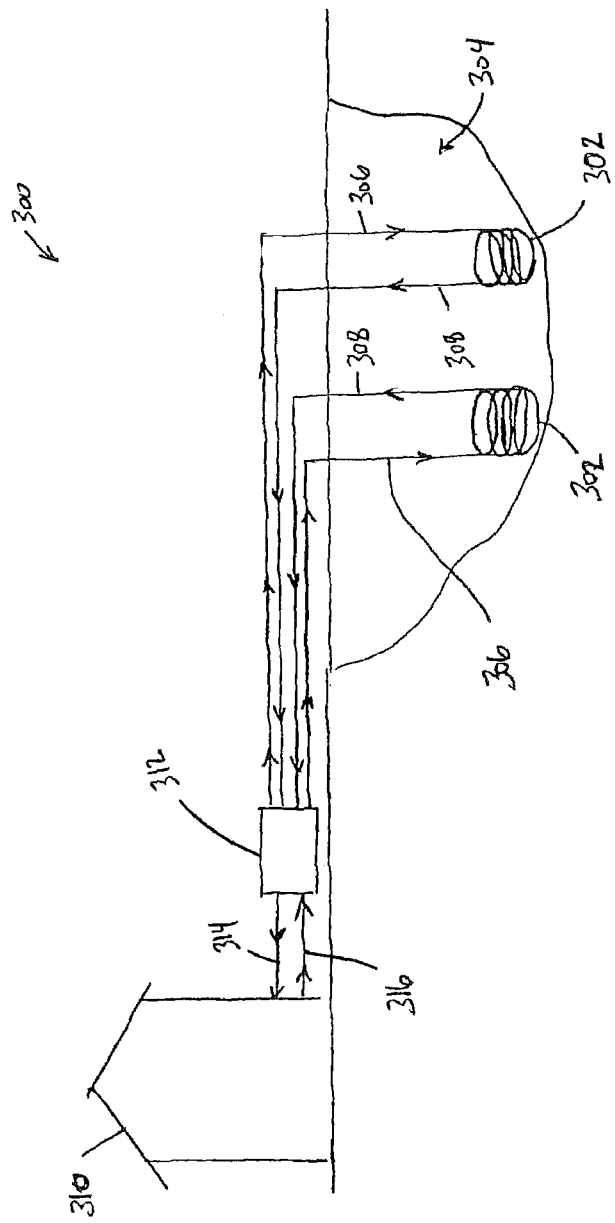
FIG. 7 is a schematic diagram of a geothermal energy source in accordance with one embodiment of the heating and cooling system of the present invention.

FIG. 7 illustrates an embodiment of a geothermal pond system that may be used as an energy source for the heating and cooling system of the present invention. The energy exchange with water is possible at a much higher rate than with soil and installation costs are significantly lower. The geothermal pond system 300 includes a plurality of hollow continuous loops 302 submerged a desired distance in a pond or other similar body of water. Depending on the latitude, the temperature of water below a certain depth remains substantially constant throughout the year. In one embodiment, the geothermal pond system is incorporated into a pond or lake having a substantially constant temperature at a certain depth between about fifty degrees (50°) and about seventy degrees (70°) Fahrenheit. The geothermal pond system 300 includes at least one return water conduit 306 and one supply water conduit 308. When warming an interior space in building 310, warm water heated at the bottom of pond 304 after passing through loops 302, travels through the supply conduit 308 to heat exchanger 312. Heat is exchanged in heat exchanger 312 into system supply line 314 that brings the heated heat transfer fluid into the slab in building 310. Once heat as been transferred from the system supply line 314, the cooled heat transfer fluid returns to heat exchanger 312 via system return line 316 where the heat transfer fluid is again heated. The cooled geothermal water is then returned to loops 302 through return conduit 306 where it is then heated by the surrounding water and cycled back to the heat exchanger. The geothermal pond system is also functional in the summer as the water at the bottom of the pond is generally cooler than the air temperature and can be used to efficiently cool the building.

Figure 8:
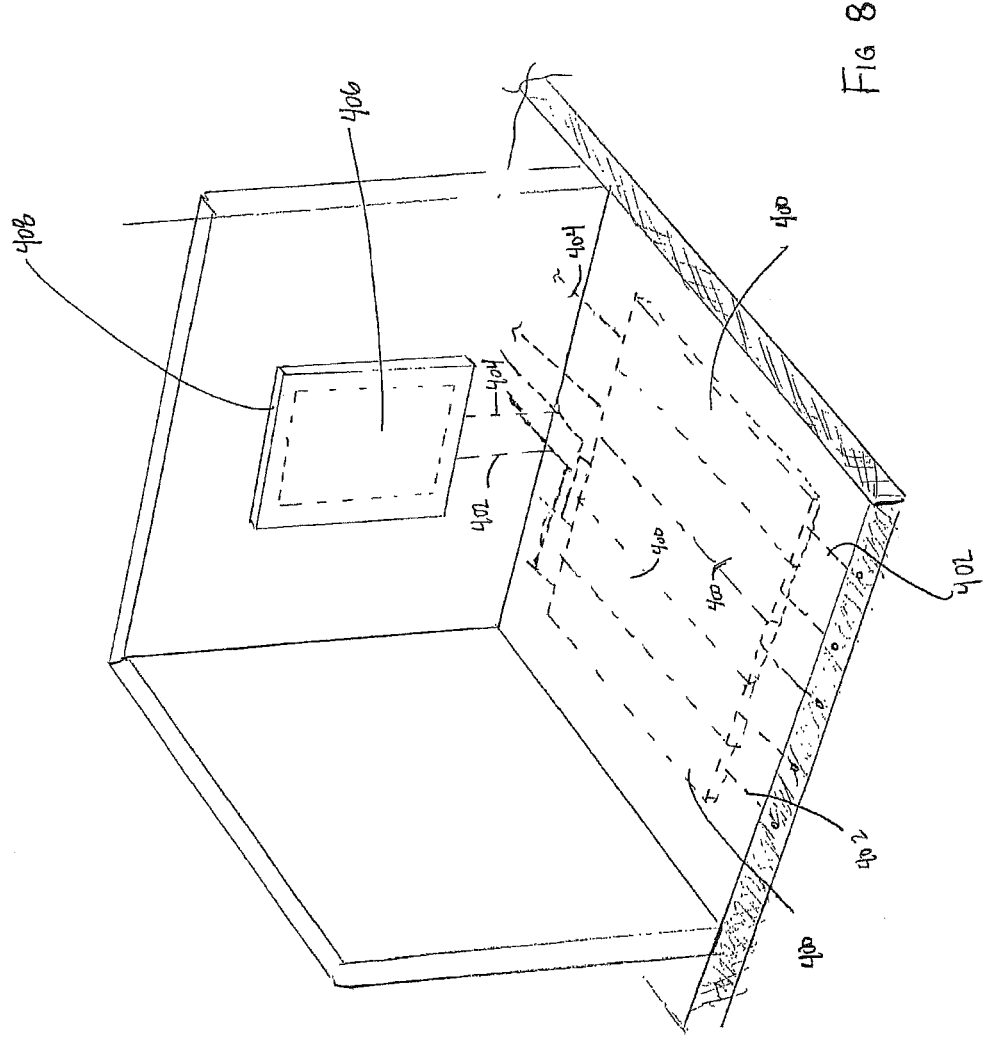
FIG. 8 is a perspective view of a modular lattice and phase change material panel in accordance with one embodiment of the heating and cooling system of the present invention.

FIG. 8 illustrates an embodiment of the heating cooling system of the present invention wherein the PCMs are incorporated into panels in thermal communication with the thermal mass for retrofit applications akin to floor tiles, wall tiles, or ceiling tiles, and may be in thermal communication with the surface of the thermal mass or within the space immediately adjacent to the thermal mass. PCMs may be integrated into a modular panel 400 that can be embedded into the slab construction as shown. Modular panel may include a lattice support portion and a layer or volume of a known PCM. The supply lines 402 and return lines 404 may also be embedded in the slab and operably connected to panel 400. Further, panel 400 may be configured as a structural concrete form wherein panel 400 has a conduit build into it to convey the heat transfer fluid. This form may be used to pour the structural concrete floor and then remain in place to be incorporated into the building's heating and cooling system. Panels 400 may be configured to be connected to each other as shown, or may be placed individually at strategic areas of heat loss like entry ways or by windows. Further, each panel 400 may have a known heat output and the number of panels 400 maybe selected to heat a room having a set area making it easy for design professional to match the heating demand for the area of each room. An alternative embodiment where at least one PCM panel 406 is integrated into a wall panel 408 wherein wall panel 408 may be a material that acts as a heat sink, however, because the PCMs themselves radiate heat and store heat energy, wall panel 408 may simply comprise a mass of PCMs on a support lattice and a covering or decorative finish over PCM panel 406 may be utilized. The panel 408 may be plumbed through conduits built into or running within the wall. Similar to wall panel 408, a PCM modular panel may be incorporated into a retrofit floor covering wherein the PCMs and conduits are formed into the panel and a sufficient wearing surface can be implemented into the top of the panel.

An embodiment of heating and cooling system of the present invention implementing a geothermal energy source as shown in FIG. 3 operates by heating heat transfer fluid in the lower loop 36 by the lower heat exchanger 38 to a high temperature, for example, in the range of 120°-130° F. using the geothermally constant temperature groundwater as a source of geothermal heat. The fluid thus heated is circulated to the upper heat exchanger 42 where the thermal energy is transferred to a heat transfer fluid in the upper loop 44. Thus, a circulating fluid at a first lower temperature in winter may be heated, for example to 80° F. and thereby circulated by pump 44 into the network of conduits 14 in slab 32. Heat is thereby transferred into the PCMs in slab 32, which is held in position by the lattice 46, which, may be a material such as graphite. When the desired energy level in the PCMs is reached, as may be determined by thermostat 26 or the phase change sensor, throttle 22 may be reduced or turned off in order to gain energy efficiencies. Once the PCMs have been thermally charged, the pump speed may be reduced to only input enough thermal energy to maintain the energy store in the PCMs until the stored energy is desired to be released. Thereafter the PCMs will transfer their retained energy from slab 32 to the slab top surface 48, keeping it free of snow and ice, in the winter and also radiating a portion of the retained energy as heat into the adjacent atmosphere. This cycle may be repeated as needed. The heating and cooling system 10 of the present invention may use the same principles to heat the interior of a building. The phase change sensor can be used to provide feedback as to the material phase of the PCMs (solid or liquid) in the slab and may also be used to provide the temperature of the PCMs. The heating and cooling system of the present invention may control the input of heat energy into the system to achieve a particular temperature of the PCM or to maintain a particular material phase of the PCM.

In the summer, for cooling, the heated ambient air transfers energy into the PCMs in slab 32. At selected times, either through a manual operation or by controller 20 in wireless communication with throttle 22, pump 24 and thermostat 26, an operator or automatic operation of the thermostat 26, a signal is sent to the throttle 22 to initiate circulation. The heat transfer fluid in upper loop 44 has received heat energy from the PCMs in the circulating conduits 14 in the slab 12. When engaged upon initiation, the fluid in the upper loop 44 is received by the upper heat exchanger 42 which exchanges the thermal energy of the fluid in the upper loop 44 into the fluid in the lower loop 36 where it is circulated into the geothermal lower loop 36 therein to dissipate heat into the groundwater or soil by the lower heat exchanger 38. Fluid cooled thereby is re-circulated through lower loop 36 into the upper heat exchanger 42 which will output cooled water into the upper loop 44, which is thereafter pumped by pump 24 into slab 32 through conduits 14 wherein the heat transfer fluid may receive and absorb more thermal energy from the PCMs in the slab. This process continues until the energy in the PCMs is sufficiently low to cool slab 32 thereby absorbing heat from the surrounding atmosphere.

An embodiment of the heating and cooling system of the present invention shown in FIG. 7 operates in a similar manner wherein the lower loop constitutes return conduit 306 and supply conduit 308 wherein the loops 302 act as the lower heat exchanger. The remaining portion of the system is substantially identical. An embodiment of the present invention incorporating an electric current supply introducing electrical current flowing through a circuit that includes electric resistance elements in thermal communication with the thermal mass to generate heat energy within the thermal mass to be radiated into the surrounding environment. Electricity flows from the heat exchanger (electricity source) through the slab, the resistors and back to the heat exchanger to complete the circuit.

Figure 4:
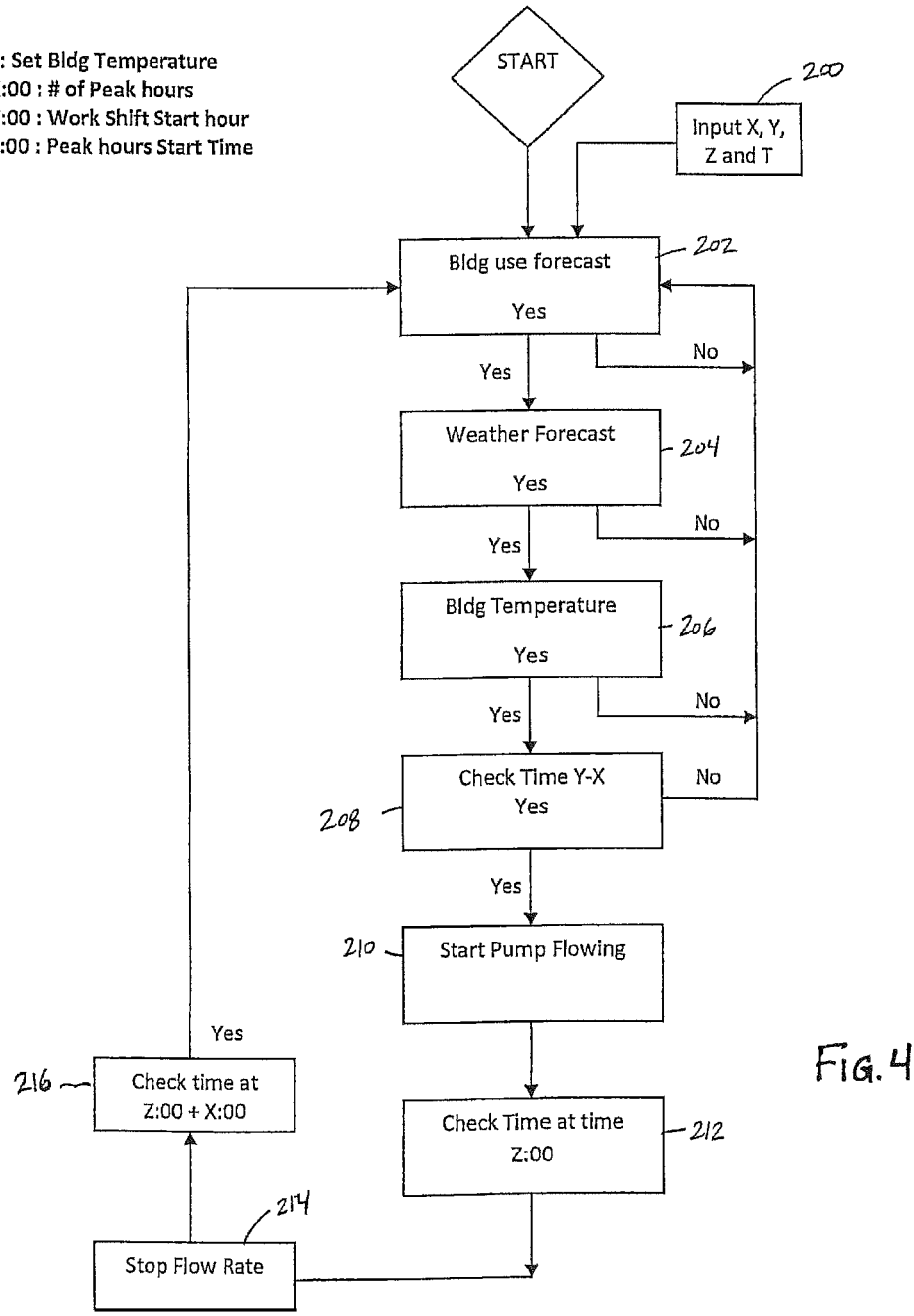
FIG. 4 is a schematic diagram of the steps in the control system in accordance with one embodiment of the heating and cooling system of the present invention.

Now turning to FIG. 4, which illustrates steps carried out in the embodiment of the heating and cooling system 10 of the present invention illustrated in FIG. 1. The system is selected and the type and amount of PCMs are optimized for the climate region and the average temperatures for the longitude and latitude of a given building to use the PCMs during the hours of peak energy demand in the summer and winter may be manually input or already stored in the internal memory of controller 20 prior to running the system of the present invention. In step 200, an operator inputs the desired building temperature T, the number of hours of peak load projected for that day X, the work shift start hour Y, and the start time of the peak load Z into controller 20, or this information can be pre-input and stored upon the internal memory. The number of hours of peak load corresponds with the hours of maximum demand on the electricity grid and generally corresponds to the highest external temperature of the day or during business hours when commercial demand is highest. Utilities also often charge a premium rate for electricity consumed during these peak hours. Further, utilities may offer lower rates for electricity consumed in off-hours to incentivize consumers to use energy at off times to even out their production costs. Pump 24 may be electric and if the system operates at full capacity during the peak period, then the result may be high utility bills.

In step 202, controller 20 obtains the building use forecast or pulls it from the internal memory. The building use forecast contains the desired internal temperature of the building during the twenty-four hour daily period. The building use forecast may also include different temperatures for weekends or other periods of low or non use of the building. In step 204, controller 20 obtains the local weather forecast from the public or private network, or pulls it from the internal memory if it was manually entered by the operator. The weather forecast provides the controller with a forecast of the outside temperature at a desired time interval, for example, hourly. In step 206, the controller electronically communicates with the building temperature thermostat or temperature sensor 26. Controller 20 temporarily stores the building use forecast, the weather forecast, and the actual internal building temperature in its internal memory. Controller 20 may obtain the real time building temperature by being in electronic communication with the thermostat 26. Controller 20 then, in step 206, checks the time on clock 30. When the time equals the work shift start hour Y minus the number of hours of the peak load X, the controller 20 initiates step 210 and opens throttle 22, activates pump 24 and starts pumping heat transfer fluid through conduits 14 and slab 12. Running the system for X hours prior to the start hour of the work shift helps the PCMs store the desired amount of thermal energy. Controller 20 may process the current building temperature and compare it with the desired interior temperature and adjust the flow of the heat transfer fluid such that the building temperature and the building use forecast temperature are substantially equal during the operation. The controller 20 continues to signal the pumping of the heat transfer fluid through slab 12 maintaining the desired building use forecast temperature.

In step 212, controller 20 checks clock 30 for peak hours start time Z. When controller 20 reads clock 30 at a time equal to the peak hours start time Z, controller 20 initiates step 214 and stops the flow of heat transfer fluid. Alternatively, controller 20 may only substantially reduce the flow rate of the heat transfer fluid to conserve energy, but still provide an input of thermal energy to supplement the thermal energy stored in the PCMs. Because the PCMs have stored thermal energy, they will gradually release that energy into slab 12 which continues to radiate the heat energy into the surrounding environment. The amount and type of PCM is selected to provide sufficient heat transfer during the entire peak period, but on extreme weather days, controller 20 may open throttle 22 and operate pump 24 to add or remove thermal energy as needed for the system to maintain the desired building use forecast temperature. In this case, the pump may still be running during the peak time, but the pump demand is significantly less thereby making operation more efficient and cost effective. In step 216, once the peak period has passed, the controller again compares the actual building temperature with the building use forecast and operating the system as necessary to keep them substantially equal and the loop restarts at 204 for the remainder of the day and/or into the next day.

Another embodiment of the heating and cooling system of the present invention includes the electricity rates at each hour of the day input into controller 20 and stored in the internal memory. Thus, the controller may further optimize the cost efficiency of the heating and cooling system by determining when the most cost efficient time to pre-load the PCMs due to the expected loading by the forecasted outside temperature and the building use forecast and the electricity rate schedule. In this manner, controller 20 may iterate the exact time to start the system to provide the estimated stored thermal energy required to meet the anticipated load demand and/or any flow of heat transfer fluid required during peak hours, if any, supplement the stored energy to maintain thermal energy pre-load and/or the desired the heating or cooling effect for the least cost. Controller 20 may also be used to optimize a combination of cost and energy efficiency depending upon the operator's motivations, for example, the operator may have a maximum daily heating and cooling budget. The system of the present invention may be configured to determine how to provide the most efficient and comfortable building temperature and carryout the operation of the system to obtain the same using the electricity rate chart and the operational characteristics of an embodiment of the system of the present invention to meet a maximum daily operation budget entered into the system by the operator or stored in the internal memory of the controller.

Controller 20 may also monitor the internal temperature of the thermal mass 12 or slab 32 using at least one temperature sensor 28 to determine when the maximum thermal energy is stored in the PCMs within the thermal mass and adjust the speed of pump 24 and throttle 22 once a desired internal temperature is reached such that the system in no longer inputting more energy into the system than is required to maintain the current thermally loaded system or supplement the thermal energy being released by the PCMs. Controlled operation of the pump to strategically add thermal energy into the system of the present invention will maintain the thermal load in the PCMs until the system determines the optimum time to release the stored thermal energy. The system of the present invention may also be configured to determine the building performance characteristics, including the amount of heat transferred to the surrounding environment based upon the difference in internal building temperature and the internal temperature of thermal mass through calibration of the system. The heating and cooling system 10 of the present invention may be further optimized by the controller 20 based upon these parameters as it considers and can determine the effect of adding or subtracting a certain amount of thermal energy provided into the system through the conduits considering the building performance characteristics, the outside temperature, the current building temperature and the desired building use forecast temperature.

From the foregoing, it may be seen that the heating and cooling system of the present invention is particularly well suited for the proposed usages thereof. Furthermore, since certain changes may be made in the above invention without departing from the scope hereof, it is intended that all matter contained in the above description or shown in the accompanying drawing be interpreted as illustrative and not in a limiting sense. It is also to be understood that the following claims are to cover certain generic and specific features described herein.

We claim:

1. A system, comprising:
    a thermal mass;
    a thermal mass temperature sensor in thermal communication with the thermal mass;
    a dual, concentric conduit system arranged within the thermal mass, the dual, concentric conduit system comprising:
        a plurality of first, outer conduits in thermal communication with the thermal mass, the plurality of first, outer conduits spaced apart from each other and embedded within the thermal mass;
        a plurality of second, inner conduits, each second, inner conduit having a smaller diameter than a corresponding first, outer conduit and arranged concentrically within the corresponding first, outer conduit;
        a heat transfer fluid arranged within each second, inner conduit of the plurality of second, inner conduits; and
        a phase change material in thermal communication with the thermal mass and arranged within the interior of each first, outer conduit of the plurality of first, outer conduits and exterior to each corresponding second, inner conduit arranged concentrically within the corresponding first, outer conduit;
    a heat exchanger in thermal communication with the plurality of second, inner conduits to transfer thermal energy from a thermal energy source to the heat transfer fluid; and
    a controller coupled to the heat exchanger and to the thermal mass temperature sensor, the controller adapted to monitor a plurality of parameters, and in response to a selected parameter of the plurality of parameters, to generate one or more control signals to the heat exchanger.

2. The system of claim 1, wherein the phase change material is microencapsulated or macroencapsulated.

3. The system of claim 1, wherein the phase change material comprises an organic phase change material.

4. The system of claim 3, wherein the organic phase change material is selected from the group consisting of: a paraffin, a fatty acid, a palm oil, a Lauric acid, and combinations thereof.

5. The system of claim 1, wherein the phase change material comprises an inorganic phase change material.

6. The system of claim 5, wherein the inorganic phase change material is selected from the group consisting of: a salt hydrate, a sodium silicate, a zinc compound, an aluminum compound, and combinations thereof.

7. The system of claim 1, wherein the phase change material comprises an organic-organic compound, an organic-inorganic compound, an inorganic-inorganic compound, a polymer, a sodium acetate, and combinations thereof.

8. The system of claim 1, wherein the thermal mass has a slab form factor and an exposed surface.

9. The system of claim 8, wherein the plurality of first, outer conduits are in contact with a surface of the thermal mass or arranged adjacent to the surface of the thermal mass.

10. The system of claim 8, wherein the thermal mass is a concrete slab.

11. The system of claim 8, wherein the thermal mass is a transportation platform.

12. The system of claim 1, further comprising:
    a plurality of sensors adapted to generate the plurality of parameters, the plurality of sensors selected from the group consisting of: the thermal mass temperature sensor, a phase change sensor, a heat transfer fluid flow rate sensor, a thermostat, an outside temperature sensor, an electricity source sensor, a conduit pressure sensor, and combinations thereof.

13. The system of claim 1, wherein the plurality of parameters comprise one or more parameters selected from the group consisting of: energy consumption, operating cost, phase change material data, phase change sensor readings, weather forecast information, electricity rate chart, usage data, outside temperature sensor readings, thermal mass temperature sensor readings, heat transfer fluid flow rate sensor readings, conduit pressure sensor readings, temperature settings, and combinations thereof.

14. A system, comprising:
    a thermal mass having a slab form factor and an exposed surface;
    a plurality of sensors adapted to generate a plurality of parameters;
    a dual, concentric conduit system arranged within the thermal mass, the dual, concentric conduit system comprising:
        a plurality of separate first, outer conduits in thermal communication with the thermal mass, the plurality of first, outer conduits spaced apart from each other and embedded within the thermal mass, the plurality of first, outer conduits further arranged in contact with the exposed surface of the thermal mass or arranged adjacent to the exposed surface of the thermal mass;
        a plurality of second, inner conduits, each second, inner conduit having a smaller diameter than a corresponding first, outer conduit and arranged concentrically within the corresponding first, outer conduit;
        a heat transfer fluid arranged within the plurality of second, inner conduits; and
        an encapsulated phase change material in thermal communication with the thermal mass and arranged within the interior of each first, outer conduit and exterior to each corresponding second, inner conduit arranged concentrically within the corresponding first, outer conduit;
    a heat exchanger in thermal communication with the plurality of second, inner conduits to transfer thermal energy from a thermal energy source to the heat transfer fluid; and
    a controller coupled to the heat exchanger and to the plurality of sensors, the controller adapted to monitor the plurality of parameters, and in response to a selected parameter of the plurality of parameters, to generate one or more control signals to the heat exchanger.

15. The system of claim 14, wherein the encapsulated phase change material comprises an organic phase change material selected from the group consisting of: a paraffin, a fatty acid, a palm oil, a Lauric acid, and combinations thereof.

16. The system of claim 14, wherein the encapsulated phase change material comprises an inorganic phase change material selected from the group consisting of: a salt hydrate, a sodium silicate, a zinc compound, an aluminum compound, and combinations thereof.

17. The system of claim 14, wherein the encapsulated phase change material comprises an organic-organic compound, an organic-inorganic compound, an inorganic-inorganic compound, a polymer, a sodium acetate, and combinations thereof.

18. The system of claim 14, wherein the plurality of sensors are selected from the group consisting of: the thermal mass temperature sensor, a phase change sensor, a heat transfer fluid flow rate sensor, a thermostat, an outside temperature sensor, an electricity source sensor, a conduit pressure sensor, and combinations thereof.

19. The system of claim 14, wherein the plurality of parameters comprise one or more parameters selected from the group consisting of: energy consumption, operating cost, phase change material data, phase change sensor readings, weather forecast information, electricity rate chart, usage data, outside temperature sensor readings, thermal mass temperature sensor readings, heat transfer fluid flow rate sensor readings, conduit pressure sensor readings, temperature settings, and combinations thereof.

20. A system, comprising:
a thermal mass having a slab form factor and an exposed surface;
a plurality of sensors adapted to generate a plurality of parameters, wherein the plurality of sensors are selected from the group consisting of: the thermal mass temperature sensor, a phase change sensor, a heat transfer fluid flow rate sensor, a thermostat, an outside temperature sensor, an electricity source sensor, a conduit pressure sensor, and combinations thereof;
a dual, concentric conduit system arranged within the thermal mass, the dual, concentric conduit system comprising:

a plurality of separate first, outer conduits in thermal communication with the thermal mass, the plurality of first, outer conduits spaced apart from each other and embedded within the thermal mass, the plurality of first, outer conduits further arranged in contact with the exposed surface of the thermal mass or arranged adjacent to the exposed surface of the thermal mass;

a plurality of second, inner conduits, a single second, inner conduit of the plurality of second, inner conduits arranged concentrically within a corresponding first, outer conduit of the plurality of first, outer conduits;

a heat transfer fluid arranged within each second, inner conduit of the plurality of second, inner conduits; and an encapsulated phase change material in thermal communication with the thermal mass and arranged within the interior of each first, outer conduit of the plurality of first, outer conduits and exterior to each corresponding second, inner conduit of the plurality of second, inner conduits;

a heat exchanger in thermal communication with each second, inner conduit of the plurality of second, inner conduits to transfer thermal energy from a thermal energy source to the heat transfer fluid;

a pump coupled to the heat exchanger;

a memory circuit; and a controller coupled to the heat exchanger, to the memory circuit and to the plurality of sensors, the controller adapted to monitor the plurality of parameters, and in response to a selected parameter of the plurality of parameters, to generate one or more control signals to the heat exchanger, wherein the plurality of parameters comprise at least three parameters selected from the group consisting of: energy consumption, operating cost, phase change material data, phase change sensor readings, weather forecast information, electricity rate chart, usage data, outside temperature sensor readings, thermal mass temperature sensor readings, heat transfer fluid flow rate sensor readings, conduit pressure sensor readings, temperature settings, and combinations thereof.

* * * * *